US012613722B1

(12) United States Patent

Hardt et al.

(10) Patent No.: US 12,613,722 B1

(45) Date of Patent: Apr. 28, 2026

(54) VIRTUAL DEVICES IN A RELIABLE DISTRIBUTED COMPUTING SYSTEM

(71) Applicant: Scale Computing, Inc., Austin, TX (US)

(72) Inventors: Nate Hardt, San Carlos, CA (US); Scott Loughmiller, San Francisco, CA (US); Philip White, San Carlos, CA (US)

(73) Assignee: Scale Computing, Inc., Austin, TX (US)

( * ) Notice: Subject to any disclaimer, the term of this patent is extended or adjusted under 35 U.S.C. 154(b) by 0 days.

(21) Appl. No.: 16/718,103

(22) Filed: Dec. 17, 2019

Related U.S. Application Data

(63) Continuation of application No. 14/554,017, filed on Nov. 25, 2014, now Pat. No. 10,509,662.

(51) Int. Cl.
*G06F 9/455* (2018.01)
*H04L 9/40* (2022.01)

(52) U.S. Cl.
CPC ...... *G06F 9/45558* (2013.01); *H04L 63/1433* (2013.01); *G06F 2009/45587* (2013.01); *G06F 2009/45595* (2013.01)

(58) Field of Classification Search
CPC ....... G06F 9/45558; G06F 2009/45587; G06F 2009/45595; H04L 63/1433
See application file for complete search history.

(56) References Cited

U.S. PATENT DOCUMENTS

| | | | | |
|---|---|---|---|---|
| 7,315,976 B2* | 1/2008 | Holt | .................... | G06F 11/1076 |
| | | | | 714/766 |
| 9,830,090 B1* | 11/2017 | Hardt | ...................... | G06F 9/455 |
| 10,019,321 B1* | 7/2018 | Aron | ................... | G06F 11/1451 |
| 2005/0195660 A1* | 9/2005 | Kavuri | .................. | G06F 3/0607 |
| | | | | 365/189.05 |
| 2006/0080568 A1* | 4/2006 | Subbaraman | ....... | G06F 11/2023 |
| | | | | 714/E11.073 |

(Continued)

*Primary Examiner* — Daxin Wu

(74) *Attorney, Agent, or Firm* — Kowert, Hood, Munyon, Rankin & Goetzel, P.C.; Jeffrey C. Hood; Matthew C. Washburn

(57) ABSTRACT

Providing differing degrees of reliability or security for distinct devices within a reliable distributed system. Allowing virtual machines to operate in a reliable distributed system without either exposing the actual available devices to guest operating systems, or requiring the guest OS to maintain, or to maintain information about, reliability or security. Methods are responsive to a hierarchy of possible reliability or security failures, to guard more carefully against simultaneous failures of reliability or breaches of security, without additional work or delay. Functions invoked by the user that relate to reliability and security are hidden, so the user can specify a degree of reliability or security without having to implement those requirements themselves. Providing a uniform set of resources available to all users, separating out those individual resources that are allocated to particular users, and emulating particular devices at the request of those particular users. Users do not have access to "real" devices the distributed system can use, only "virtual" devices presented by the distributed system, where those virtual devices have properties similar, but not necessarily equal, to real devices.

20 Claims, 2 Drawing Sheets

Matrix 200

|  | 202 VSD 0 | 202 VSD 1 | 202 VSD 2 | 202 VSD 3 | 202 VSD 4 | 202 VSD 5 |
|---|---|---|---|---|---|---|
| 201 → Failure Group 0 | | | | | | |
| 201 → Failure Group 1 | | | | 1 (204) | | 203 |
| 201 → Failure Group 2 | | 203 | | 2 (204) | | |

(56)　　　　　References Cited

U.S. PATENT DOCUMENTS

2006/0088323 A1*　4/2006　Morisawa .......... G03G 15/5012
　　　　　　　　　　　　　　　399/21
2010/0169948 A1*　7/2010　Budko ................... H04L 9/088
　　　　　　　　　　　　　　　726/1
2010/0333089 A1*　12/2010　Talwar ............... G06F 9/45558
　　　　　　　　　　　　　　　718/1
2011/0255418 A1*　10/2011　van Greunen ...... H04L 41/0659
　　　　　　　　　　　　　　　370/242
2017/0046226 A1*　2/2017　Wang ................. G06F 11/1088
2021/0049240 A1*　2/2021　Earl ................... G06F 9/45558

* cited by examiner

System 100

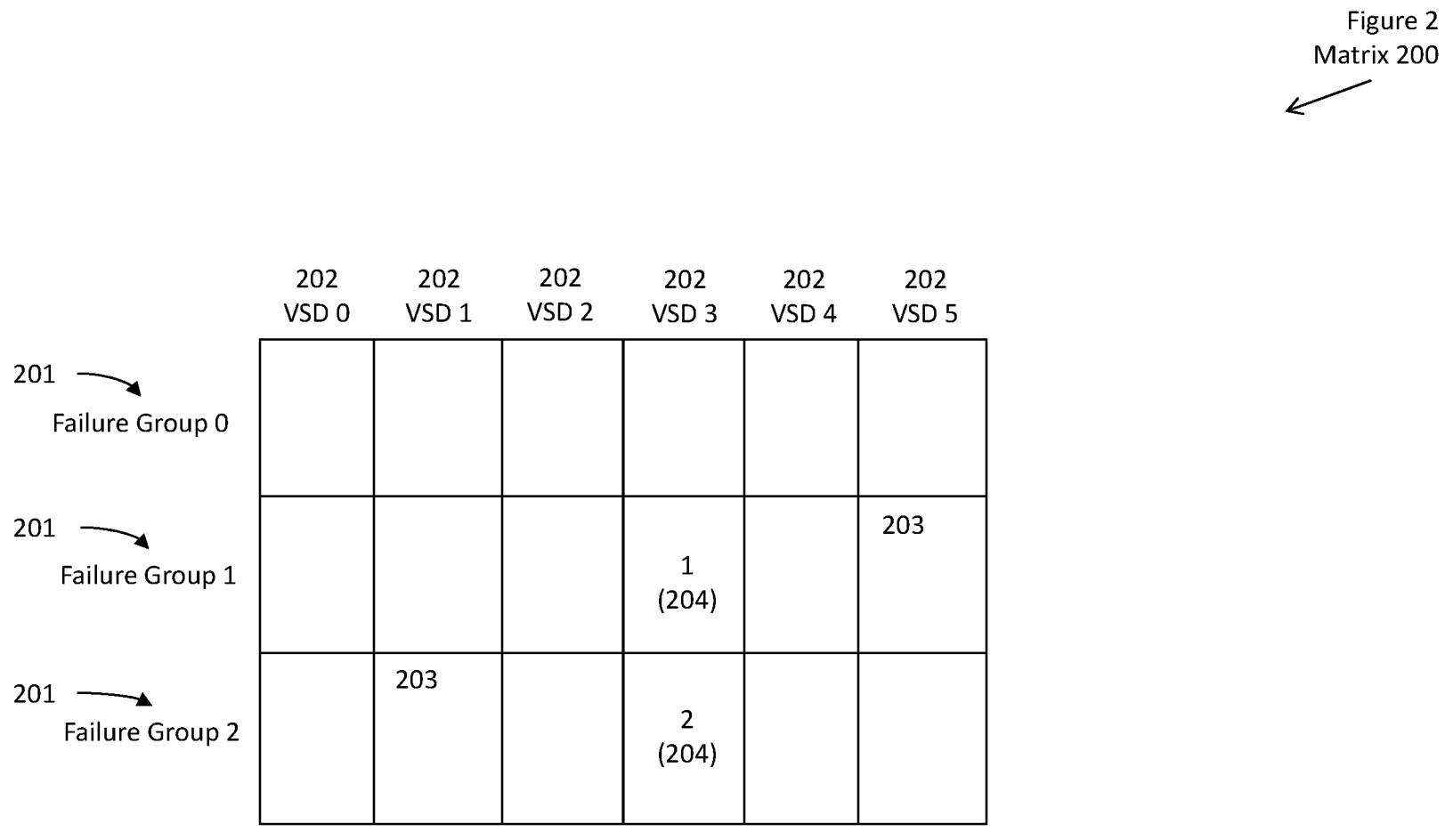

Figure 2
Matrix 200

| | 202 VSD 0 | 202 VSD 1 | 202 VSD 2 | 202 VSD 3 | 202 VSD 4 | 202 VSD 5 |
|---|---|---|---|---|---|---|
| 201 Failure Group 0 | | | | | | |
| 201 Failure Group 1 | | | | 1 (204) | | 203 |
| 201 Failure Group 2 | | 203 | | 2 (204) | | |

VIRTUAL DEVICES IN A RELIABLE DISTRIBUTED COMPUTING SYSTEM

INCORPORATED DISCLOSURES

This Application describes technologies that can be used with inventions, and other technologies, described in one or more of the following Applications, each assigned to the same assignee:

Application 61/909,118, filed Nov. 26, 2013, in the name of Scott Loughmiller and Philip White, titled "Reduplication of de-duplicated files in a fault-tolerant distributed cluster".

Application 61/909,301, filed Nov. 26, 2013, in the name of Aaron Page 1 and Nate Hardt, titled "Resource management in a virtual machine cluster".

Application 61/909,336, filed Nov. 26, 2013, in the name of Aaron Page 1 and Nate Hardt, titled "Resource management in a virtual machine cluster".

Application 61/909,342, filed Nov. 26, 2013, in the name of Aaron Page 1 and Nate Hardt, titled "Resource management in a virtual machine cluster".

Application 61/909,344, filed Nov. 26, 2013, in the name of Nate Hardt, Scott Loughmiller, and Philip White, titled "Unanticipated operational requirements in a reliable distributed computing system".

Application 61/909,365, filed Nov. 26, 2013, in the name of Nate Hardt, Scott Loughmiller, and Philip White, titled "Recovery after data loss in a reliable distributed computing system".

Application 61/909,352, filed Nov. 26, 2013, in the name of Nate Hardt, Scott Loughmiller, and Philip White, titled "Metadata caches in a reliable distributed computing system".

Application 61/909,356, filed Nov. 26, 2013, in the name of Nate Hardt, Scott Loughmiller, and Philip White, titled "Remote access latency in a reliable distributed computing system".

Application 62/080,773, filed Nov. 17, 2014, in the name of Clint McVey and Scott Loughmiller, titled "Zero memory buffer copying in a reliable distributed computing system".

Application 62/080,791, filed Nov. 17, 2014, in the name of Nate Hardt, Scott Loughmiller, and Philip White, titled "Virtual devices in a reliable distributed computing system".

Application No. 62/123,740, filed Nov. 25, 2014, in the name of Scott Loughmiller, Philip White, Aaron Page 1, Nate Hardt, and Clint McVey, titled "Reliable Independent Block Engine and State Machine".

Each and every one of these documents, as well as all documents cited therein, are hereby incorporated by reference as if fully recited herein.

This application claims priority of the Incorporated Documents, and to each and every document cited therein, to the fullest extent possible.

No aspect of incorporating these documents by reference is intended to be limiting in any way. The scope and spirit of the invention remains as broad as possible, given the specification and original claims of this Application. These Incorporated Documents are additive in nature, and can be combined with the technical matter described herein, in whole or in part.

RELATED APPLICATIONS

This Application describes technologies that can be used with inventions, and other technologies, described in one or more of the following Applications, each assigned to the same assignee:

U.S. Provisional Application 61/651,391, filed May 24, 2012, in the name of inventors Jason Collier, Scott Loughmiller, and Philip White, titled "Unified hypervisor and distributed fault-tolerant storage".

U.S. application Ser. No. 13/901,325, filed May 23, 2013, in the name of inventors Jason Collier, Scott Loughmiller, and Philip White, titled "Unified hypervisor and distributed fault-tolerant storage".

U.S. application Ser. No. 14/229,748, filed Mar. 28, 2014, in the name of inventors Philip White, and Hank Hsien, titled "Placement engine for a block device".

U.S. application Ser. No. 14/318,414, filed Jun. 27, 2014, in the name of inventors Philip White, titled "Shared reference counters among a plurality of virtual storage devices".

U.S. application Ser. No. 14/320,427, filed Jun. 30, 2014, in the name of inventors Philip White, titled "Efficient migration of virtual storage devices to a remote node using snapshots".

Each and every one of these documents, as well as all documents cited therein, are hereby incorporated by reference as if fully recited herein.

This application claims priority of the Incorporated Documents, and to each and every document cited therein, to the fullest extent possible.

No aspect of incorporating these documents by reference is intended to be limiting in any way. The scope and spirit of the invention remains as broad as possible, given the specification and original claims of this Application. These Incorporated Documents are additive in nature, and can be combined with the technical matter described herein, in whole or in part.

BACKGROUND

Field of the Disclosure

This application generally relates to virtual devices, reliable computing systems, distributed computing systems, and other matters.

Background of the Disclosure

Some computing systems are capable of emulating selected hardware devices, which might or might not be physically present at the computing system. These systems are sometimes called "virtual machines" ("VM's"), in which the code being executed to allocate and control physical resources is sometimes called the "host operating system" ("host OS"), and in which the code being executed to allocate and control emulated resources is sometimes called the "guest operating system" ("guest OS"). For example, it might occur that the host OS has a number of available storage elements, such as disk drives, and one or more guest OS's each have one or more partitions (or other portions) of those storage elements made available thereto.

It sometimes occurs that the computing system maintains a distributed file system, with the idea that a distributed file system might be less subject to failure and more resilient to error. This same concern can apply to other resources made available to the virtual machine, such as processor power, network bandwidth, or otherwise. This can pose the difficulty of implementing the requirements of the distributed file system at each guest OS desiring such qualities, which might be an arduous process and subject to error. Moreover, this can pose the difficulty of exposing the real devices to a guest OS, which might be unsafe if the guest OS includes any malware or erroneous code.

Each of these issues, as well as other possible considerations, might cause difficulty in aspects of operating computing systems, particularly in those computing systems in which virtual machines are implemented, or in computing systems making use of distributed resources.

BRIEF SUMMARY OF THE DISCLOSURE

This application provides techniques that can provide differing degrees of reliability or security for distinct devices within a reliable distributed system. Moreover, this application provides techniques that can allow virtual machines to operate in a reliable distributed system without either (A) exposing the actual available devices to guest operating systems ("OS's"), or (B) requiring the guest OS to maintain, or to maintain information about, reliability or security.

In one embodiment, the techniques can be responsive to a hierarchy of possible reliability or security failures, with the effect that the system can guard more carefully against simultaneous failures of reliability or breaches of security, without additional work performed by a user and without additional delay experienced by the user.

In one embodiment, those functions invoked by the user (such as a guest OS, or an application executed by that guest OS) that relate to reliability and security can be hidden from the user, with the effect that the user can specify a degree of reliability, or a degree of security, or both, without having to implement those requirements and without having to determine how those requirements can be achieved in a distributed system.

In one embodiment, the techniques can provide a uniform set of resources available to all users, separating out those individual resources that are allocated to particular users, and emulating particular devices at the request of those particular users. This has the effect that the user does not have access to "real" devices the distributed system can use, only "virtual" devices presented by the distributed system, where those virtual devices have properties similar to (but not necessarily equal to) real devices.

After reading this application, those skilled in the art would recognize that techniques shown in this application are applicable to more than just the specific embodiments shown herein. For a first example, the concept of a virtual machine or virtual device is intended to be broad, and can include multiple cooperating devices, a portion of a device having some of the emulated function and another portion of the device having another portion of the emulated function, or otherwise. For a second example, the concept of reliability is intended to be broad, and can include granting greater availability to a process or thread that has greater authorization than another process or thread.

While multiple embodiments are disclosed, including variations thereof, still other embodiments of the present application will become apparent to those skilled in the art from the following detailed description, which shows and describes illustrative embodiments of the application. The application is capable of modifications in various aspects, all without departing from its scope or spirit. The drawings and detailed description are illustrative in nature and not restrictive.

BRIEF DESCRIPTION OF THE FIGURES

FIG. 2 shows a conceptual drawing of a failure matrix.

DETAILED DESCRIPTION

Terms and Phrases

Figure 1:
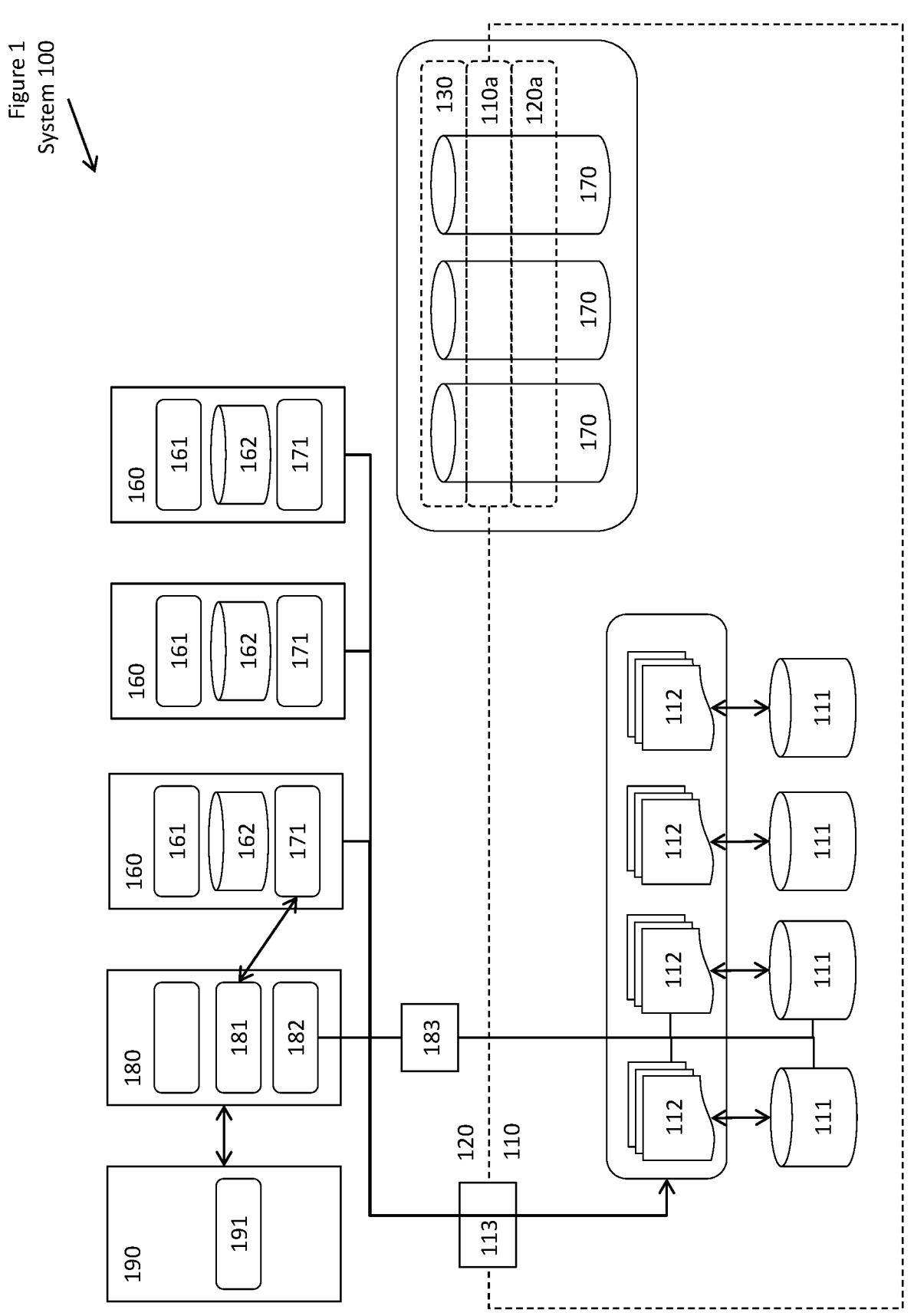
FIG. 1 shows a conceptual drawing of a system.

The following definitions are intended to be exemplary and illustrative, not necessarily limiting:

The phrase "real storage device", the term "RSD", and variants thereof, generally refer to any physical device with which the computer system can communicate.

The phrase "virtual storage device", the term "VSD", and variants thereof, generally refer to any virtual device whose capabilities are emulated by a host operating system or virtual machine.

FIGURES AND TEXT

FIG. 1 shows a conceptual drawing of a system.
FIG. 2 shows a conceptual drawing of a failure matrix.

SYSTEM OVERVIEW

FIG. 1 shows a conceptual drawing of a system.

A system 100 includes elements described herein, other elements shown in the figure, and possibly other elements. In one embodiment, the system 100 includes two or more redundant nodes; however, the figure only shows one of those nodes. This one of multiple nodes is also in communication with those other nodes, with the effect of providing a reliable distributed computer system. As the multiple nodes frequently communicate the content of their memory and storage devices, the system 100 can be considered as if it were a distributed computer system with multiple real storage devices (RSD's) and a shared memory, each accessible to all processors of each individual redundant node. Accordingly, the figure should be considered to represent a distributed computer system with a shared memory and a set of shared RSD's.

Kernel Elements

The system 100 can include a kernel 110, that can include a set of kernel elements, or in addition to or in lieu thereof, a set of elements operating at a kernel level of authorization. The system 100 can also include a userspace 120, that can include a set of user elements, or in addition to or in lieu thereof, a set of elements operating at a user level of authorization (other than the kernel level of authorization).

The kernel 110 can be managed by a Linux kernel, and can include one or more real storage devices (RSD's) 111. While this application primarily describes RSD's 111 as storage devices, it is alternatively possible that they are other types of devices. For a first example, RSD's 111 could be network interface cards (NIC's), or any other suitable device, coupled to the kernel 110 using an iSCSI interface. For a second example, RSD's 111 could be another other device capable of operating as described herein.

As described herein, in one embodiment, RSD's 111 can include disk drives or other mass storage devices, such as SSD drives or otherwise, and can each be associated with a device queue 112. The device queue 112 can include instructions from a user in the userspace 120 (authorized by user access to the kernel, and sanitized by the kernel), and can include data to be written, locations of where to place data to be read, read/write instructions, responses to read/write instructions, and possibly error messages. As further described herein, the RSD's 111 and the device queues 112 can be managed by an I/O Manager (as further described herein) that provides user access to the kernel through a kernel access port 113.

The system 100 also includes at least some shared memory 110 (optionally, each individual node can include some non-shared memory). The shared memory 110 is shown in the figure as being on the border between kernel-accessible memory 120 and user-accessible memory 130, as the shared memory 110 can be accessed by either user resources or kernel resources. The distinction between user resources and kernel resources is further described herein.

Virtual Machines

The system 100 also can include one or more virtual machines (VM) 160, each including a guest operating system (guest OS) 161 and a host operating system (host OS), the latter including a set of drivers and indicated as Qemu 162. Each of the one or more guest OS's 161 can call on one or more of the drivers associated with its own copy of Qemu 162. Its Qemu 162 can include device drivers for virtual storage devices (VSD's) 170, each of which emulates a real-world storage device, although not necessarily a real-world storage device that is actually manufactured and sold.

While this application primarily describes VSD's 170 as storage devices, it is alternatively possible that they are other types of virtual devices. For a first example, VSD's 170 could be network interface cards (NIC's), or any other suitable device, coupled to its Qemu 162 using an iSCSI interface. For a second example, VSD's 170 could be another other device capable of operating as described herein.

Upon receiving an instruction to read/write, from/to, one or more VSD's 170, its Qemu 162 sends that instruction to a block driver element in the hypervisor that is managing its Qemu 162. That block driver element sends the instruction to a libscribe element 171, that performs the work of reading/writing data from/to the one or more RSD's 111 associated with those one or more VSD's 170. The libscribe element 171 is shown coupled to the RSD's 111 and their device queues 112, but in reality, the libscribe element 171 operates using a scribed daemon 180, and in particular, a libscribe server 181 within that scribed daemon 180.

"Scribed" Server

Accordingly, the libscribe element 171 sends the read/write instruction to the scribed daemon 180, an in particular, to the libscribe server 181 that can be included in the scribed daemon 180. (The scribed daemon 180 can operate using a scaled daemon 190, and in particular, a state machine 191 in the scaled daemon 190.) The libscribe server 181 sends the read/write instructions to an I/O Manager 182, which can be granted authorization to access selected portions of the kernel element 110, such as using a port 183.

The I/O Manager 182, using the port 183, can call upon the kernel element 110 to send the read/write instructions to the RSD's 111 and their device queues 112, where they can be executed and responded to. The I/O Manager 182, using the port 183, can obtain responses to the read/write instructions from the RSD's 111 and their device queues 112. The I/O Manager 182 can return those responses to the libscribe server 181, which can return them to the libscribe element 171, which can return them to the associated Qemu 162, which can return them to the associated guest OS 161.

This has the effect that the guest OS 161, which attempts to issue read/write instructions to a VSD 170, instead has those read/write instructions rewritten and redirected to one or more RSD's 111, upon which the data and metadata for that VSD 170 are stored.

Reliability and Security

In one embodiment, the system 100 can provide a level of reliability (or security) for each VSD 170, without effort by, and even without knowledge of, any VM 160. For example, the system 100 can provide RAID-level reliability for each VSD 170, with the effect that the system 100 operates as a reliable storage system in addition to operating as a distributed computing system.

For example, in such embodiments, whenever a VM 160 writes to a VSD 170, the system 100 can, in the course of performing that operation, also perform operations to assure reliability (or security). In the example of RAID-level reliability, the system 100 can cause each data block written to a VSD 170 to be in fact written to two (or more) separate RSD's 111. This has the effect that if the first of those two separate RSD's 111 fails for any reason, the data will not be lost if it can still be accessed from the second of those two separate RSD's 111. In such examples, the system 100 is protected against any single point of failure.

Moreover, in such examples, the operation of the system 100 in performing the RAID-level reliability can be hidden from the user (either a guest OS, or an application making a request of a guest OS). This has the effect that the user can read and write to a VSD 170 without any knowledge of the reliability (and possibly security) protections that the system 100 is performing. In such cases, the system 100 can make the VSD 170 looks like a uniform set of blocks organized as the type of hardware expected by the user.

In another embodiment, the system 100 can receive direction or guidance from the user with respect to the degree of reliability or security the user desires. In such examples, when the user specifies a degree of reliability for a particular VSD 170, the system 100 implements that degree of reliability for data blocks written to that particular VSD 170, without any need for the user to implement any part of the reliability desired.

In one such example, the user could specify that each data block is maintained using four copies, instead of two copies, for a particular VSD 170. In response thereto, the system 100 can maintain four copies of each block, instead of two copies, on distinct RSD's 111, without any additional work by the user. The user does not have to determine when to make copies, where to place those copies, how to handle the distributed nature of the system 100, how to handle individual or multiple failures, and otherwise. The user need only know that it has specified four copies, and the system 100 can implement that specification without further action by the user.

Degrees of Reliability. In one embodiment, the system 100 can provide a call or a message from the guest OS to the hypervisor, that allows the user to specify a degree of reliability to be maintained for a particular VSD 170, or possibly for a particular portion of a VSD 170, such as a particular file, a particular directory, a particular partition, or otherwise. As noted herein, the user need not use that call or message, and can accept a default degree or measure of reliability. In such cases, the system 100 can maintain the default degree of reliability without informing the user, without involving the user in implementation thereof, and without the user even knowing about the system's operations.

In some embodiments, the user can use the call or message from the guest OS to the hypervisor, to specify a degree or measure of reliability that is acceptable to the user. As noted herein, the system 100 can accept such specifications from the user for a particular file, a particular directory, a particular partition, or otherwise. Some examples of degrees or measures of reliability can include one or more of the following: (A) a choice between "high," "medium," or "low" reliability; (B) a number of copies of each data block to make; (C) a particular RAID implementation; (D) a particular type of error-correcting code to use with data for each data block, such as ordinary parity, a CRC, a Reed-Solomon code, or otherwise; (E) a particular highest acceptable bit-error rate; or otherwise.

Failure Hierarchy. It is also desirable to protect against multiple concurrent failures of RSD's 111, or of other devices that might be needed to access those RSD's 111. For example, a single storage node can include multiple RSD's 111, such as three or more RSD's 111. If a VM 160 writes to a VSD 170, and the system 100 protects against a single point of failure by writing data blocks to a first RSD 111 and a second RSD 111, it might still occur that multiple concurrent failures would make those data blocks unavailable. For example, the first RSD 111 could fail (preventing access to the first copy of those data blocks), and the switch access to the second RSD 111 could also fail (preventing access to the second copy of those data blocks).

To protect against multiple concurrent failures, the system 100 maintains sets of failure groups, where a "failure group" includes those RSD's 111 whose concurrent unavailability would cause data to become lost or unavailable. The inventors are aware that multiple failures of RSD's 111 are most likely to occur when the RSD's 111 are logically closer. In one embodiment, the system 100 allocates RSD's 111 for storage of data blocks for VSD's 170 in a failure hierarchy, where the "failure hierarchy" places RSD's 111 that are logically closer at a lower levels of a logical hierarchy. For example:

Multiple RSD's 111 on the same node are riskier than

Multiple RSD's 111 on the same rack of nodes, which are riskier than

Multiple RSD's 111 on the same bank of racks, which are riskier than

Multiple RSD's 111 in the same room of devices, which are riskier than

Multiple RSD's 111 in the same building, which are riskier than

Multiple RSD's 111 in the same cluster of buildings, . . . And so on.

One element of reasoning for this particular failure hierarchy is as follows: A single node can fail at once by a variety of means, such as failure of the node's motherboard. A single rack of nodes has multiple (relatively unlikely) points of failure, such as its power source. A single bank of racks of nodes can fail similarly to a single rack of nodes, but is much less likely to do so. A single room of devices can fail at once due to a power or communication failure in a portion of a building. A single building, or a cluster of buildings, can all fail at once due to a natural disaster, such as an earthquake or fire, and so on.

Failure Matrix

FIG. 2 shows a conceptual drawing of a failure matrix.

A matrix 200 includes elements described herein, other elements shown in the figure, and possibly other elements. The matrix 200 includes a set of rows 201, each representing a failure group, such as a single rack of nodes, as described herein. The matrix 200 includes a set of columns 202, each representing disposition of RSD's 111 for a VSD 170, such as assignment of particular storage disks to maintain data blocks for a directory in that VSD 170, as described herein. At the intersection of each row 201 and column 202, the matrix 200 includes an entry 203. Each entry 203 can be blank, or can include a value 204. A blank entry 203 can indicate that the cross-product of its failure group and VSD 170 are not being used. An entry 203 can indicate that the cross-product of its failure group and VSD 170 are being used by a particular copy of the data blocks for that VSD 170.

When directed to write data to a VSD 170, the system 100 determines whether the VSD 170 has a sufficient number of copies of its data blocks being maintained, and if so, writes that data to each of those copies. If not, or if alternatively the user desires a greater degree or measure of reliability that involves an additional copy, the system 100 determines an additional location where an additional copy can be maintained. For example, if the user were to require that VSD 3 must have three copies maintained instead of two copies, the system 100 can allocate a third copy to failure group o shown in the figure. The system can mark the entry 203 at the intersection of that failure group and that VSD 170 with a value 204 to indicate that the cross-product of that failure group and that VSD 170 is in use by a particular copy of the data blocks for that VSD 170.

Alternative Embodiments

While some embodiments are generally described herein with respect to degrees or measures of reliability and security in a distributed system, in the context of the invention, there is no particular requirement for any such limitation. For example, individual elements or method steps of the described embodiments could be replaced with substitutes that perform similar functions in other contexts. Examples of such contexts can include any system in which devices are protected in a multi-process or multi-threaded system in which processes (or threads) have differing security authorization.

While some embodiments are generally described herein with respect to reconciling degrees or measures of reliability and security with possible groups of elements that might fail concurrently, in the context of the invention, there is no particular requirement for any such limitation. For example, individual elements or method steps of the described embodiments could be replaced with substitutes that perform similar functions in other contexts. Examples of such contexts can include any system in which reliability or security in a distributed system involves cooperation of distinct devices that might independently fail or become unavailable.

Elements of the system are described herein with respect to one or more possible embodiments, and are not intended to be limiting in any way. In the context of the invention, there is the particular requirement for any such limitations as described with respect to any elements of the system. For example, individual elements of the described apparatuses could be replaced with substitutes that perform similar functions. Moreover, as described herein, many individual elements of the described apparatuses are optional, and are not required for operation.

Although control elements of the one or more described apparatuses are described herein as being executed as if on a single computing device, in the context of the invention, there is no particular requirement for any such limitation. For example, the control elements of the one or more described apparatuses can include more than one computing device, not necessarily all similar, on which the element's functions are performed.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable program-mable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifi-cations, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improve-ments may fall within the scope of the disclosure and the inventive subject matter.

The invention claimed is:

1. A method, in a reliable distributed computing system, said system including one or more virtual machines, each said virtual machine having access to a plurality of virtual devices, each said virtual machine operating under a control of a guest operating system, of providing differing degrees of reliability for distinct devices accessible by said one or more virtual machines in said reliable distributed computing system;

said method including steps of:

providing a set of real devices available to said one or more virtual machines;

emulating said one or more virtual devices using said set of real devices, said steps of emulating including:

being responsive to distinct metadata associated with each of said one or more virtual machines, said metadata defining within said set of real devices a plurality of reliability requirements, for each one or more of said virtual devices, defining a set of failure groups, and assuring that real devices associated with each of those failure groups are subject to the reliability requirements of said metadata;

wherein said steps of emulating are responsive to said differing degrees of reliability with respect to distinct virtual devices, and wherein the metadata can require protection against mul-tiple concurrent failures;

wherein the metadata defines a first set and a second set of failure groups to include real devices which are disposed according to one or more of the following:

the first set and the second set of failure groups are disposed on separate nodes, whereby those included real devices are respectively required to be emulated across those separate nodes, the first set and the second set of failure groups are disposed on separate racks of nodes, whereby those included real devices are respectively required to be emulated across those separate racks of nodes, the first set and the second set of failure groups are disposed on separate banks of racks, whereby those included real devices are respectively required to be emulated across those separate banks of racks, the first set and the second set of failure groups are disposed on separate rooms of devices, whereby those included real devices are respectively required to be emulated across those separate rooms of devices, the first set and the second set of failure groups are disposed with respect to separate buildings, whereby those included real devices are respectively required to be emulated across those separate buildings, or the first set and the second set of failure groups are disposed with respect to separate clusters of buildings, whereby those included real devices are respectively required to be emulated across those separate clusters of buildings.

2. The method as in claim 1, including steps of providing one or more functions invocable by one or more of said virtual machines, said functions individually or collectively disposed to specify a degree of desired reliability.

3. The method as in claim 2, wherein said steps of emulating are responsive to said differing degrees of security with respect to distinct virtual devices.

4. The method as in claim 1, wherein said degree of desired reliability includes data reliability; and said steps of emulating include steps of assuring that a collection of concurrent failures are protected against;

wherein said collection of concurrent failures includes concurrent failures within designated groups of said real devices.

5. The method as in claim 4, wherein said designated groups of said real devices include more than one level in a failure hierarchy, in which logically closer real devices are considered closer together in said failure hierarchy.

6. The method as in claim 1, wherein said degree of desired reliability includes data reliability; and said steps of emulating include steps of assuring that a number of concurrent failures, response to said meta-data, are protected against.

7. The method as in claim 6, wherein said number of concurrent failures is other than a RAID specification.

8. The method as in claim 1, wherein said degree of desired reliability includes security; and said steps of emulating include steps of assuring that said designated group of real devices are not vulnerable to security breaches.

9. The method as in claim 8, wherein said vulnerability to security breaches includes a location of one or more of said devices.

10. Apparatus including a reliable distributed computing system, said system including one or more virtual machines, each said virtual machine having access to a plurality of virtual devices, each said virtual machine operating under a control of a guest operating system;

one or more guest operating systems, each guest operating system being subject to a control of an associated host operating system, each said host operating system having control of one or more real devices;

each said host operating system including one or more elements of non-transitory storage, said non-transitory storage including instructions disposed to be executed by a computing devices, said instructions associating said real devices with said virtual devices, and disposed to emulate said virtual devices using one or more associated real devices, said instructions causing said computing devices to associate said real devices with said virtual devices, and disposed to assure that said instructions cause said virtual devices to meet a selected degree of reliability; wherein each said host operating system includes metadata associated with each of said one or more virtual machines;

said instructions in response to said metadata, define for each one or more of said virtual devices, one or more failure groups; and said instructions, in response to said failure groups, cause said computing devices to associate multiple real devices in the same failure groups with distinct virtual devices, wherein the metadata can require protection against multiple concurrent failures;

wherein the metadata defines a first set and a second set of failure groups to include real devices which are disposed according to one or more of the following:

the first set and the second set of failure groups are disposed on separate nodes, whereby those included real devices are respectively required to be emulated across those separate nodes, the first set and the second set of failure groups are disposed on separate racks of nodes, whereby those included real devices are respectively required to be emulated across those separate racks of nodes, the first set and the second set of failure groups are disposed on separate banks of racks, whereby those included real devices are respectively required to be emulated across those separate banks of racks, the first set and the second set of failure groups are disposed on separate rooms of devices, whereby those included real devices are respectively required to be emulated across those separate rooms of devices, the first set and the second set of failure groups are disposed with respect to separate buildings, whereby those included real devices are respectively required to be emulated across those separate buildings, or the first set and the second set of failure groups are disposed with respect to separate clusters of buildings, whereby those included real devices are respectively required to be emulated across those separate clusters of buildings.

11. The apparatus as in claim 10, including
instructions provided one or more functions invocable by one or more of said virtual machines, said functions individually or collectively disposed to specify a degree of desired reliability.

12. The apparatus as in claim 11, wherein said differing degrees of desired soundness includes one or more of: reliability, security instructions cause said virtual storage devices to meet said degree of security.

13. The apparatus as in claim 10, wherein
said degree of desired reliability includes data reliability; and
said instructions cause said computing device to assure that a collection of concurrent failures are protected against;
wherein said collection of concurrent failures includes concurrent failures within designated groups of said real storage devices.

14. The apparatus as in claim 13, wherein
said designated groups of said real storage devices include more than one level in a failure hierarchy, in which logically closer real storage devices are considered closer together in said failure hierarchy.

15. The apparatus as in claim 10, wherein
said degree of desired reliability includes data reliability; and
said instructions cause said computing device to assure that a number of concurrent failures, responsive to said metadata, are protected against.

16. The apparatus as in claim 15, wherein
said number of concurrent failures is other than a RAID specification.

17. The apparatus as in claim 10, wherein
said degree of desired reliability includes a degree of desired security; and
said instructions cause said computing devices to assure that said designated groups of real storage devices are not vulnerable to security breaches.

18. The apparatus as in claim 17, wherein said vulnerability to security breaches includes a location of one or more of said real storage devices.

19. A method,
in a reliable distributed computing system, said system including one or more virtual machines, each said virtual machine having access to a plurality of virtual storage devices, each said virtual machine operating under a control of a guest operating system,
of providing differing degrees of reliability for distinct devices accessible by said one or more virtual machines in said reliable distributed computing system;
said method including steps of:
providing a set of real devices available to said one or more virtual machines;
emulating said one or more virtual devices using said set of real devices, said steps of emulating including:
being responsive to distinct metadata associated with each of said one or more virtual machines, said metadata defining within said set of real devices a plurality of security requirements,
for each one or more of said virtual devices, defining a set of failure groups, and
assuring that real devices associated with each of those failure groups are subject to security requirements defined by said metadata;
wherein said steps of emulating are responsive to said differing degrees of security with respect to distinct virtual devices, and
wherein the metadata can require protection against multiple concurrent failures;
wherein a first set and a second set of failure groups are defined to include real devices which are disposed according to one or more of the following:
the first set and the second set of failure groups are disposed on separate nodes, whereby those included real devices are respectively required to be emulated across those separate nodes,
the first set and the second set of failure groups are disposed on separate racks of nodes, whereby those included real devices are respectively required to be emulated across those separate racks of nodes,
the first set and the second set of failure groups are disposed on separate banks of racks, whereby those included real devices are respectively required to be emulated across those separate banks of racks, the first set and the second set of failure groups are disposed on separate rooms of devices, whereby those included real devices are respectively required to be emulated across those separate rooms of devices, the first set and the second set of failure groups are disposed with respect to separate buildings, whereby those included real devices are respectively required to be emulated across those separate buildings, or the first set and the second set of failure groups are disposed with respect to separate clusters of buildings, whereby those included real devices are respectively required to be emulated across those separate clusters of buildings.

20. The method as in claim 19, including steps of providing one or more functions invocable by one or more of said virtual machines, said functions individually or collectively disposed to specify a degree of desired security.

\* \* \* \* \*